(12) United States Patent
Tani et al.

(10) Patent No.: US 6,705,104 B2
(45) Date of Patent: Mar. 16, 2004

(54) FRESH WATER GENERATING APPARATUS

(75) Inventors: Kazuhiko Tani, Shimizu (JP); Shinichiro Yamada, Yaizu (JP)

(73) Assignee: Hitachi, Ltd., trustee, for the benefit of Hitachi Air Conditioning Systems, Co., Ltd., Tokyo (JP)

( * ) Notice: Subject to any disclaimer, the term of this patent is extended or adjusted under 35 U.S.C. 154(b) by 191 days.

(21) Appl. No.: 09/987,840

(22) Filed: Nov. 16, 2001

(65) Prior Publication Data

US 2002/0189273 A1 Dec. 19, 2002

(30) Foreign Application Priority Data

Jun. 15, 2001 (JP) ........................................ 2001-180989

(51) Int. Cl.[7] ............................................... F25D 21/14
(52) U.S. Cl. ............................................. 62/291; 62/93
(58) Field of Search .......................... 62/291, 93, 285; 165/95, 72

(56) References Cited

U.S. PATENT DOCUMENTS

| | | | | |
|---|---|---|---|---|
| 4,572,785 A | * | 2/1986 | Braaten | 210/181 |
| 4,872,319 A | * | 10/1989 | Tongu | 62/141 |
| 5,149,446 A | * | 9/1992 | Reidy | 210/744 |
| 5,259,203 A | * | 11/1993 | Engel et al. | 62/150 |
| 5,301,516 A | * | 4/1994 | Poindexter | 62/126 |
| 5,398,517 A | * | 3/1995 | Poindexter | 62/125 |
| 6,058,718 A | * | 5/2000 | Forsberg et al. | 62/125 |
| 6,490,879 B1 | * | 12/2002 | Lloyd et al. | 62/291 |

* cited by examiner

*Primary Examiner*—Melvin Jones
(74) *Attorney, Agent, or Firm*—Antonelli, Terry, Stout & Kraus, LLP

(57) ABSTRACT

In a fresh water generating apparatus for condensing water content contained in air, there are provided a first heat exchanger having a refrigerant gas flow passage to which a compressed refrigerant gas is introduced, and on an outer side of which air is blown to condense the refrigerant gas, a second heat exchanger having a refrigerant liquid flow passage to which a refrigerant liquid discharged from the first heat exchanger is introduced after a pressure thereof is reduced, and on an outer side of which air is blown to cool the air and condense the water content to produce fresh water, and a power source for compressing the refrigerant gas and blowing the air.

5 Claims, 7 Drawing Sheets

FRESH WATER GENERATING APPARATUS

BACKGROUND OF THE INVENTION

1. Field of the Invention

The present invention relates to a fresh water generating apparatus condensing a water content in an atmospheric air so as to generate a fresh water, and more particularly to a structure preferably used for generating a fresh water in a desert area having a comparatively high temperature or the like by utilizing a refrigerating cycle.

2. Description of the Prior Art

In the desert area, it is very hard to secure a life water such as a drinking water, an agricultural water, an industrial water and the like, there is a little river and it is hard to utilize the river. Further, an underground water has been utilized, however, when the underground water is dipped too much, a sea water gets into the underground water.

Further, a seawater desalination plane has been placed in a coastal area so as to obtain the water from the sea water, however, it is impossible to completely remove a salt content in the sea water, and a small amount of salt content is left in the obtained water.

Accordingly, there has been proposed an apparatus for condensing the water content in the air so as to obtain the fresh water, whereby there has been a structure in which a plurality of fresh water generating panels having hollow inner portions are placed and a refrigerant cooled by a cooling unit is circulated within the fresh water generating panels, thereby condensing the water content in the air on the surfaces of the fresh water generating panels so as to generate the fresh water. This structure is described, for example, in JP-A-9-99201.

In the prior art mentioned above, it is hard to sufficiently cool the refrigerant flowing through the fresh water generating panels by the cooling unit, and there is a case that an outside air temperature reaches 50° C. in the desert area or the like. Accordingly, since it is impossible to make the temperature of the cooling unit sufficiently low when cooling the refrigerant by the high temperature ambient air, an efficiency of fresh water generation is reduced and it is hard to efficiently generate a lot of fresh water.

Further, in a place to which an electric power is not supplied, such as a developing area and the like, since it is impossible to generate the fresh water and the drinking water is very greatly demanded, it is desired to make the generated fresh water the drinking water.

SUMMARY OF THE INVENTION

An object of the present invention is to solve the problems in the prior art mentioned above so as to obtain a structure having an improved fresh water generating efficiency and suitable for generating a lot of water. Further, another object of the present invention is to obtain a structure in which a region for placement does not depend on a matter whether or not an electric power is supplied, it is easy to transfer due to a compact size, and an excellent property in view of a maintenance and an operability can be provided.

In this case, the present invention solves at least any one of the objects and the problems mentioned above.

In order to solve the problems mentioned above, in accordance with the present invention, there is provided a fresh water generating apparatus for condensing a water content contained in an air so as to collect by utilizing a refrigeration cycle, comprising:

a first heat exchanger having a refrigerant gas flow passage to which a compressed refrigerant gas is introduced, and blowing the air in an outer side of the refrigerant gas flow passage so as to condense the refrigerant gas;

a second heat exchanger having a refrigerant liquid flow passage to which a refrigerant liquid discharged from the first heat exchanger is introduced after a pressure thereof is reduced, and blowing the air in an outer side of the refrigerant liquid flow passage so as to cool; and a power source for compressing the refrigerant gas and blowing the air, wherein the second heat exchanger is placed at an upstream position within the air flow passage in which the air is blown, the first heat exchanger is placed at a downstream position, the power source introduces an ambient air containing a water content corresponding to the air from an external portion of a chamber, and the second heat exchanger condenses the water content in the ambient air so as to generate a fresh water.

In this case, the power source for compressing the refrigerant gas and blowing the air means compressing and blowing by using the power source, and it is particularly executed by driving a compressor for compressing the refrigerant gas by a power generator having a fuel tank, a fuel battery, a solar battery, a wind power generator or the like, or an air blower rotated by a direct-current motor or an alternating-current motor.

Accordingly, since the first heat exchanger is placed at a downstream position of the second heat exchanger, the water content in the ambient air is condensed by the second heat exchanger, whereby the cooled ambient air reaches the first heat exchanger. Then, since it is possible to effectively cool the compressed refrigerant gas introduced to the first heat exchanger, and it is possible to condense the refrigerant gas by the first heat exchanger without compressing the refrigerant gas to a high pressure, it is possible to generate the fresh water at a high efficiency.

Accordingly, it is possible to make the power source for compressing the refrigerant gas and blowing the air comparatively compact, and it is possible to make the structure having an easy transferring property, an excellent maintenance property and an excellent operability.

Further, in accordance with the present invention, there is provided a fresh water generating apparatus for condensing a water content contained in an air so as to collect by utilizing a refrigeration cycle, comprising:

a compressor for compressing a refrigerant gas;

a condenser for cooling the refrigerant gas compressed in the compressor so as to condense;

an expansion valve for reducing a pressure of a refrigerant liquid condensed in the condenser;

an evaporator for evaporating the refrigerant liquid the pressure of which is reduced by the expansion valve;

a blower for introducing an ambient air containing a water content from an external portion of a chamber so as to blow to the condenser and the evaporator;

a water storage tank for recovering a fresh water obtained by the water content in the ambient air blown by the blower being cooled by the evaporator and condensed; and a power source for driving the compressor and the blower.

Accordingly, since the ambient air is blown to the condenser and the evaporator on the basis of the power source driving the compressor and the blower, and the condensed water is recovered in the water storage tank, it is possible to effectively cool the compressed refrigerant gas and it is possible to generate the fresh water at a high efficiency. Therefore, it is possible to make the power source comparatively compact and assemble together with the water storage tank in a compact manner.

Further, in the structure mentioned above, it is desirable to provide with a case receiving a fresh water generator receiving the first heat exchanger and the second heat exchanger, having a blow-off port on an upper surface thereof and having a heat insulating material being wound around an outer side thereof, and the power generator. Accordingly, by using a transporting means such as a truck or the like, it is possible to place in a plurality of farms (fields), factories or the like, or it is possible to supply the drinking water to dwellings or the like.

Further, in the structure mentioned above, it is desirable to provide with a case receiving a fresh water generator receiving the compressor, the condenser, the expansion valve, the evaporator and the blower, having a blow-off port on an upper surface thereof and having a heat insulating material being wound around an outer side thereof, the water storage tank and the power generator. Accordingly, it is possible to prevent a temperature within the structure from being increased even in a place where a temperature is increased during the day.

Further, in the structure mentioned above, it is desirable that the ambient air is introduced to the condenser and the evaporator via a dust filter.

Further, in the structure mentioned above, it is desirable to provide with a case receiving a fresh water generator receiving the compressor, the condenser, the expansion valve, the evaporator and the blower, having a blow-off port on an upper surface thereof and having a suction port to which a dust filter is mounted on a side surface, the water storage tank and the power generator.

Further, in the structure mentioned above, it is desirable that the evaporator is placed at an upstream position within the air flow passage to which the ambient air is blown, and the condenser is placed at a downstream position.

Further, in the structure mentioned above, it is desirable that a fuel tank in which a fuel is charged a power generator generating an electric power by using the fuel are provided, and the electric power generated by the power generator is utilized as the power source.

Further, in the structure mentioned above, it is desirable that the power source is a power generator generating an electric power by using the fuel stored in the fuel tank and the apparatus is provided with a case receiving a fresh water generator receiving the compressor, the condenser, the expansion valve, the evaporator and the blower, and having a heat insulating material being wound around an outer side thereof, the water storage tank, the power generator and the fuel tank.

Further, in the structure mentioned above, it is desirable to provide with a fresh water generator receiving the compressor, the condenser, the expansion valve, the evaporator and the blower and provided with a drain pan collecting the condensed water, and dip up the water collected in the drain pan by a pump so as to store in the water storage tank.

DESCRIPTION OF THE PREFERRED EMBODIMENTS

A description will be given below of an embodiment in accordance with the present invention.

Figure 1:
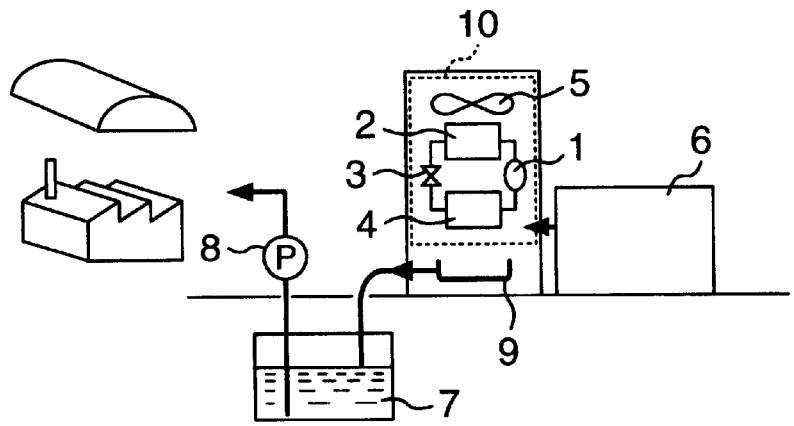
FIG. 1 is a schematic view showing a whole of an embodiment in accordance with the present invention.
Figure 2:
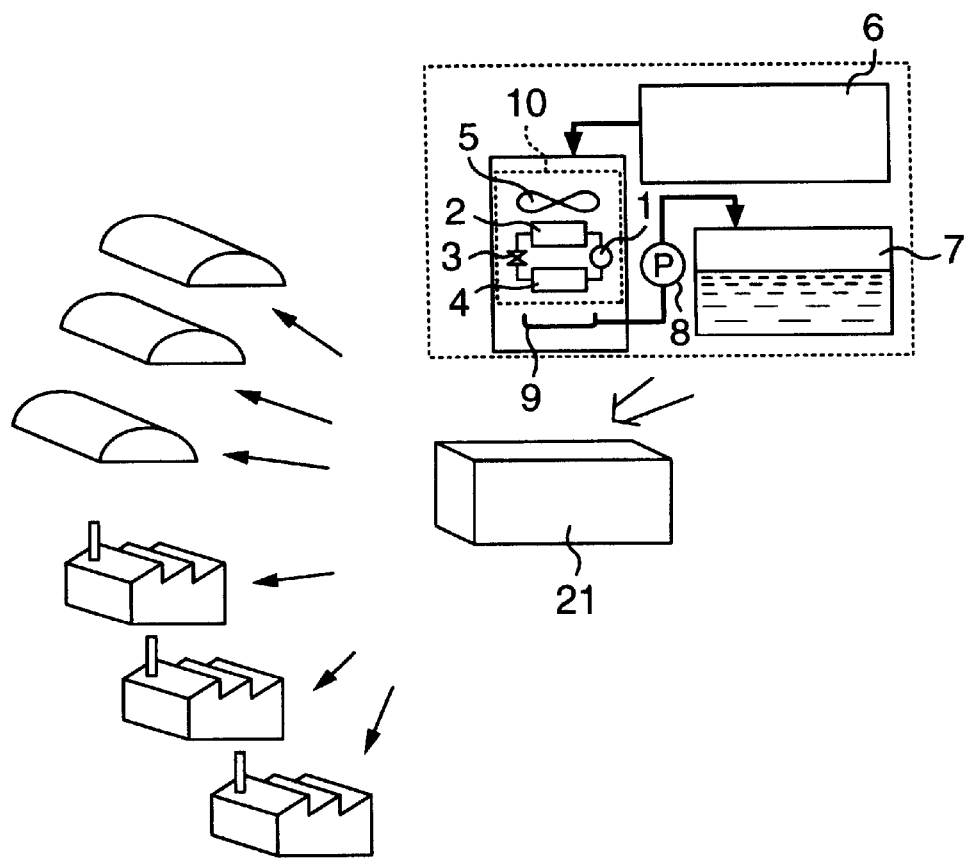
FIG. 2 is a schematic view showing a whole of another embodiment in accordance with the present invention.

FIG. 1 shows a whole structure of a fresh water generating apparatus in which a power source 6 is additionally provided, in accordance with an embodiment. A fresh water generator 10 condensing an ambient air is constituted by a refrigerant cycle having a compressor 1, a condenser 2 and an evaporator 4. A refrigerant gas becoming a high temperature and a high pressure in the compressor 1 is cooled and condensed by the condenser 2 so as to become a refrigerant liquid. This refrigerant liquid is reduced in a pressure by a pressure reducing device 3 so as to expand, and becomes a refrigerant having a low temperature and a low pressure so as to be fed to the evaporator 4. When an atmospheric air (an ambient air) containing a water content is fed within the fresh water generator 10 by a blower 5, the atmospheric air is cooled by the refrigerant having the low temperature and the low pressure at a time of flowing through the evaporator 4, and the water content contained in the atmospheric air is condensed.

Figure 10:
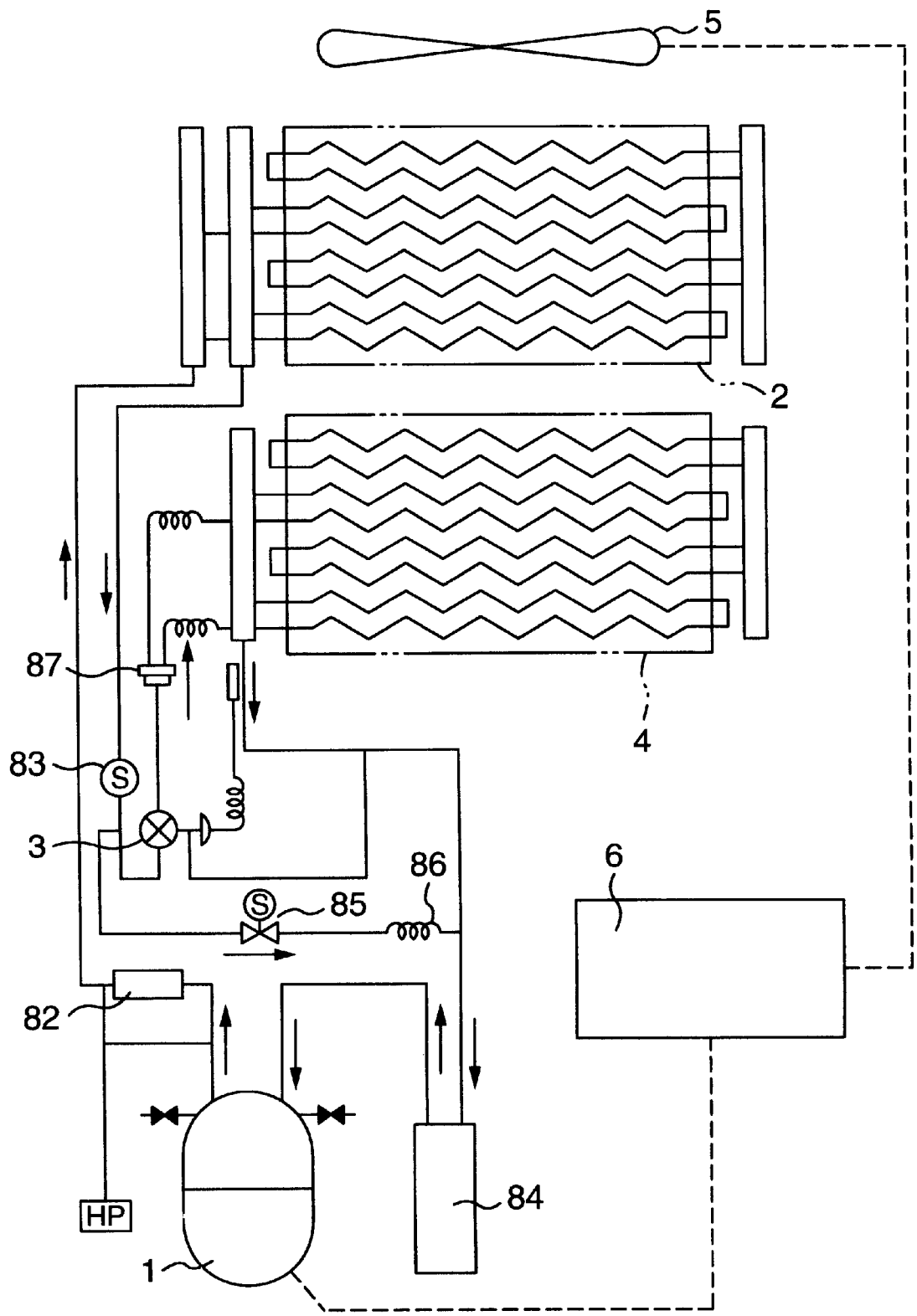
FIG. 10 is a block diagram showing a refrigerant cycle in accordance with an embodiment of the present invention.

FIG. 10 shows a refrigerant cycle of a fresh water generating apparatus in accordance with the present embodiment, and a description will be given of a detail thereof. As shown in FIG. 10, a discharge side of the compressor 1 is connected to an inlet side of the condenser 2 by a connecting piping having a silencer 82 in the middle thereof. The silencer 82 is provided for the purpose of absorbing a pulsation of the refrigerant gas compressed by the compressor 1 so as to become a high temperature and a high pressure. An outlet side of the condenser 2 is connected to a distributor 87 by a connecting piping having a strainer 83 and an expansion valve 3 in the middle thereof, and the distributor 87 is connected to an inlet side of the evaporator 3 so as to distribute the refrigerant. An outlet side of the evaporator 4 is connected to an inlet side of an accumulator 84 and an outlet side of the accumulator 84 is connected to a suction side of the compressor 1. Further, a piping having an electromagnetic valve 85 and a capillary tube 86 is provided, one end of the piping is connected to a portion between the strainer 83 and the expansion valve 3 and another end of the piping is connected to a portion between the outlet side of the evaporator 4 and the inlet side of the accumulator 84.

In the structure mentioned above, the refrigerant gas is compressed by the compressor 1 so as to become the refrigerant gas having a high temperature and a high pressure, and flows in the condenser 2 after passing through the silencer 82. The ambient air cooled by the evaporator 4 is blown to a periphery of the condenser 2 by the blower 5, and the refrigerant gas having the high temperature and the high pressure flowed in the condenser 2 exchanges heat with the ambient air around the condenser 2 so as to be cooled and condensed, thereby becoming a refrigerant liquid. The refrigerant liquid is reduced in a pressure by the expansion valve 3 after passing through the strainer 83 so as to expand, thereby becoming a refrigerant having a low temperature and a low pressure. The refrigerant flows in the evaporator 4 after being distributed by the distributor 87. The ambient air is blown around the evaporator 4 by the blower 5, and the refrigerant having the low temperature and the low pressure introduced to the evaporator 4 cools the ambient air around the evaporator 4. Accordingly, the water content contained in the ambient air is condensed so as to be attached onto a surface of the evaporator 4 as a ball of water. When keeping the operation, a lot of ball of water is attached onto the surface of the evaporator 4, and the ball of water finally grows large so as to drop down on a drain pan 9 due to a gravity. Further, the ball of water dropping down on the drain pan 9 one by one flows to one side of the drain pan 9, and flows in a water storage tank 7 via a drain discharge port. In this case, in FIG. 10, arrows denote a flow direction of the refrigerant gas or the refrigerant liquid, and the compressor 1, the blower 5, an opening degree of the expansion valve 3 and the like are driven by the power source, for example, a power generator having a fuel tank, a fuel battery, a solar battery and a wind power generator.

Further, in the fresh water generating apparatus in accordance with the present embodiment, a rotational number of the compressor 1 can be freely changed, for example, by using an inverter, that is, when increasing the rotational number, a circulating amount of the refrigerant is increased and an amount of fresh water generated in the evaporator 4 is increased, and when reducing the rotational number, the circulating amount of the refrigerant is reduced and the amount of fresh water generated in the evaporator 4 is reduced, whereby it is possible to control a fresh water generating capacity. In order to control the fresh water generating capacity, in place of changing the rotational number of the compressor 1, a rotational number of the blower 5 may be changed so as to change a blowing amount of the ambient air in the evaporator 4 and the condenser 2.

The condensed water is collected by the drain pan 9 and is stored in the water storage tank 7. An electric power for driving the compressor and the blower, and further the expansion valve is supplied by the power source 6. Accordingly, the fresh water generator 10 forming a refrigerant cycle portion having the condenser 2, the expansion valve 3, the evaporator 4 and the blower 5 in the fresh water generating apparatus, the power source 6, a dipping pump 8 moving the condensed water to the water storage tank 7 from the drain pan 9, and the water storage tank 7 are received in one case 21.

Figure 3A:
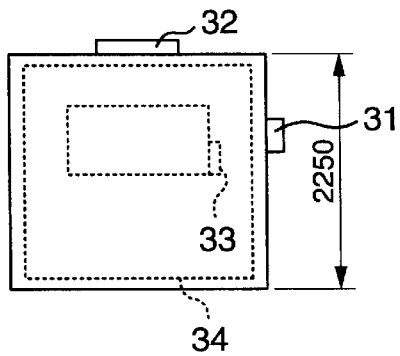
FIGS. 3A, 3B and 3C are three elevational views showing a storage (a case) in accordance with an embodiment.
Figure 3B:
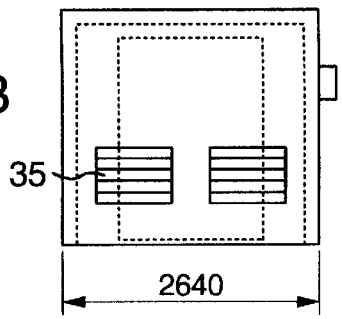
Figure 3C:
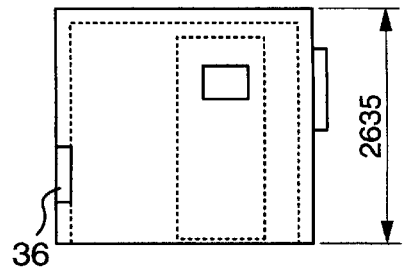

FIGS. 3A, 3B and 3C show a state that the fresh water generator 10 is received in the case 21, in which FIG. 3A is a top elevational view, FIG. 3B is a front elevational view and FIG. 3C is a side elevational view. The present case (the storage) is structured such that a heat insulating material 34 is adhered to an inner side thereof, and a ventilating port 31 discharging the ambient air taken in the interior portion is provided on a side surface, thereby preventing a temperature within the storage from being increased. Further, a filter 36 is mounted to a suction port 35 introducing the ambient air, and the ambient air is introduced to the condenser 2 or the evaporator 4, thereby preventing dusts from getting in from the external portion.

Figure 4A:
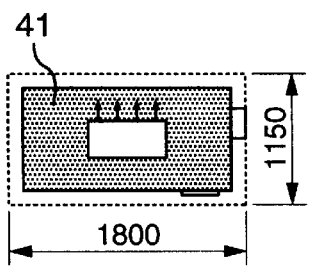
FIGS. 4A, 4B and 4C are three elevational views showing a fresh water generator in accordance with an embodiment.
Figure 4B:
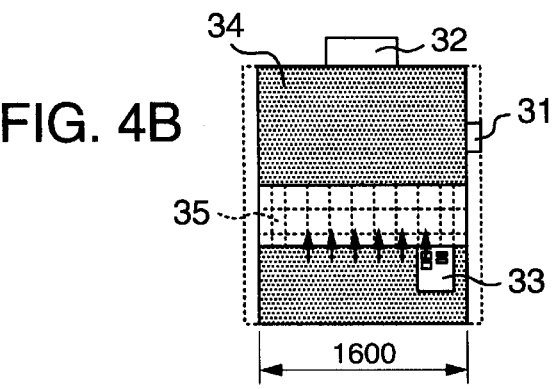
Figure 4C:
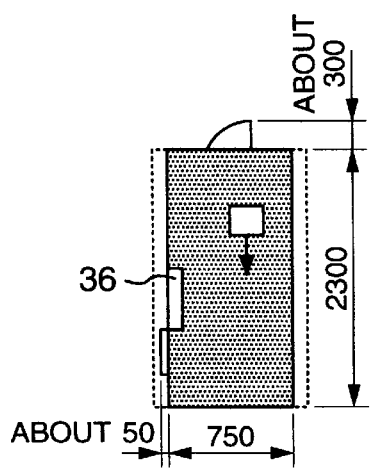

FIGS. 4A, 4B and 4C show another embodiment, in which FIG. 4A is a top elevational view, FIG. 4B is a front elevational view and FIG. 3C is a side elevational view. The heat insulating material 34 is directly wound around an outer panel of the fresh water generator 10, a blow-off port 32 and the ventilating port 31 are respectively provided in a top surface thereof and a side surface thereof so as to constitute a fresh water generator 41. The filter 36 for preventing the dusts from getting in is provided in an outer panel, and is directly mounted to the suction port 35 introducing the ambient air. Further, reference numeral 33 denotes a control panel for controlling start, stop and the like of the fresh water generating apparatus. The control panel 33 is provided on a front surface of the fresh water generator 41 or the fresh water generating apparatus 21, and can be controlled from a front surface.

As mentioned above, since the fresh water generator 41 receiving the compressor 1, the condenser 2, the expansion valve 3, the evaporator 4 and the blower 5, having the blow-off port 32 on the upper surface thereof and having the heat insulating material 34 wound around the outer side thereof, the water storage tank 7 and the power source 6 are received in one case 21, the structure is made compact, and it is possible to set a receiving space to 1600×2300×1150 mm (width×height×depth) in correspondence to 15 horse power for generating the fresh water at a rate of about 500 liters per one day.

Figure 5:
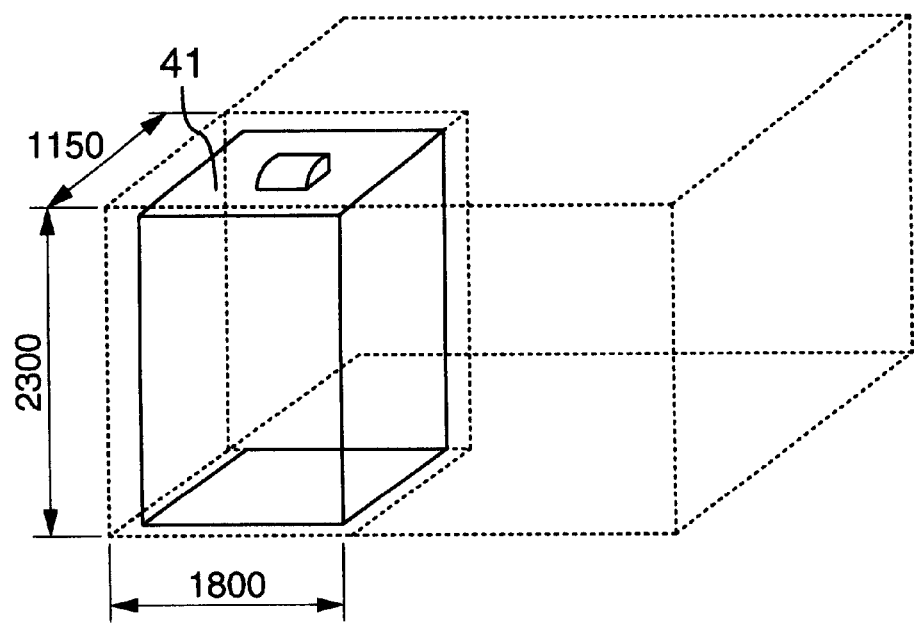
FIG. 5 is a perspective view showing a receiving state of a fresh water generator in accordance with an embodiment.
Figure 6:
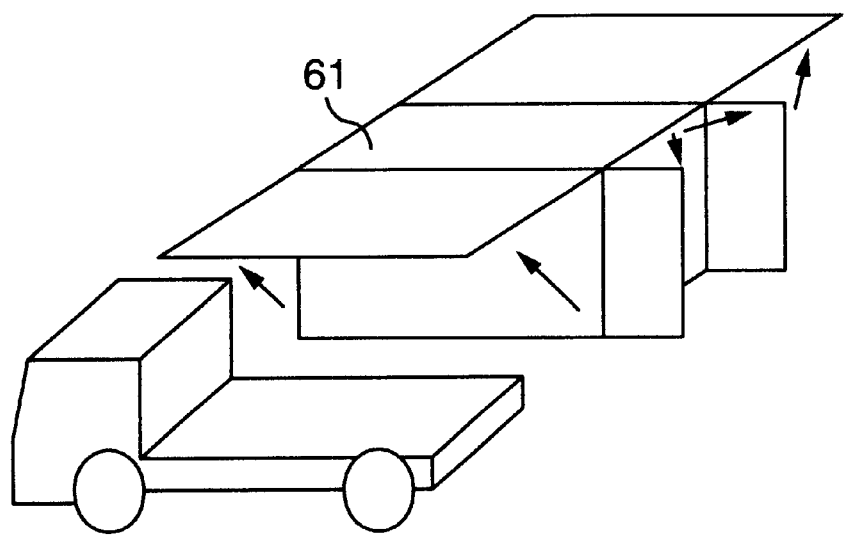
FIG. 6 is a perspective view showing a transportation container in accordance with an embodiment.
Figure 7A:
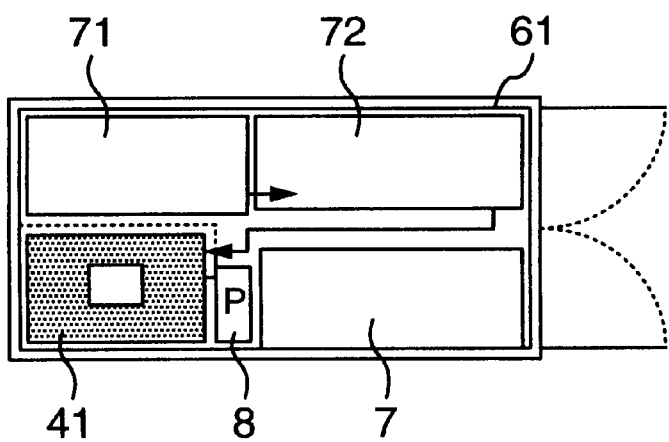
FIGS. 7A, 7B and 7C are three elevational views showing an arrangement within the container shown in FIG. 6.
Figure 7C:
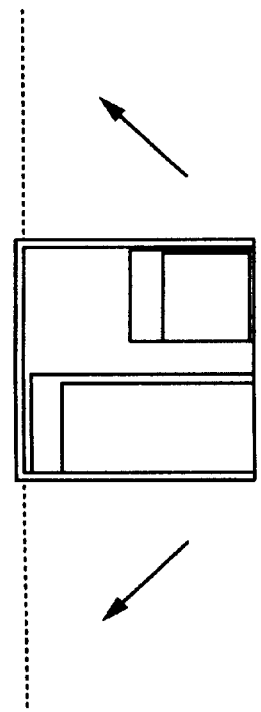
Figure 7B:
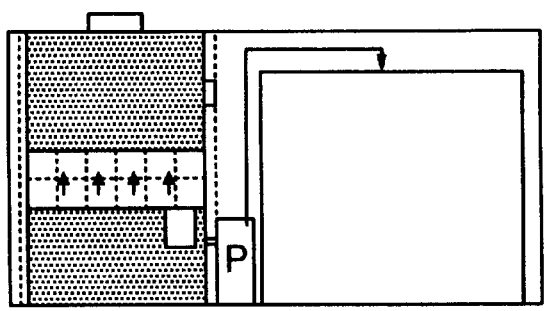

FIGS. 5 to 7 show a state that the fresh water generator 41 is received in the case 21, in which the power source 6 is constituted by a fuel tank 71 and a power generator 72, and the case 21 is constituted by a transporting container 61 opened in both side surfaces and double opened in a backward portion. In FIGS. 7A, 7B and 7C, FIG. 7A is a top elevational view, FIG. 7B is a side elevational view and FIG. 7C is a backward side elevational view (in a state that the doors are opened).

In the case of placing the fresh water generating apparatus shown in FIG. 5 in the container 61 opened in both side surfaces and double opened in the backward portion as shown in FIG. 6, the apparatus is arranged as shown in FIGS. 7A, 7B and 7C. The doors in the side surfaces of the container 61 are opened at 90 degrees, and the backward doors are opened in a double hinged manner. Accordingly, it is easy to maintain and operate the inner portion, and since the doors can be closed at a time of driving the fresh water generating apparatus except the maintenance time, it is possible to protect the fresh water generating apparatus. The fresh water generator 41 is received in the container 61 so that the fresh water generator 41 is arranged in a front surface left side in FIG. 7A, the fuel tank 71 is arranged in a backward surface side thereof, the power generator 72 is arranged in a backward surface right side thereof and the water storage tank 7 is arranged in a front surface right side thereof. An electricity generated by the power generator 72 on the basis of the fuel fed from the fuel tank 71 is supplied as a drive source of the fresh water generator 41. Further, the fresh water is generated from the air sucked from the suction port by using the electric power. The generated fresh water is dipped by the pump 8 and is stored in the water storage tank 7. In accordance with the apparatus shown in FIG. 7, the operation can be easily performed, and it is possible to smoothly supply the electric power and transfer the generated fresh water.

Figure 8A:
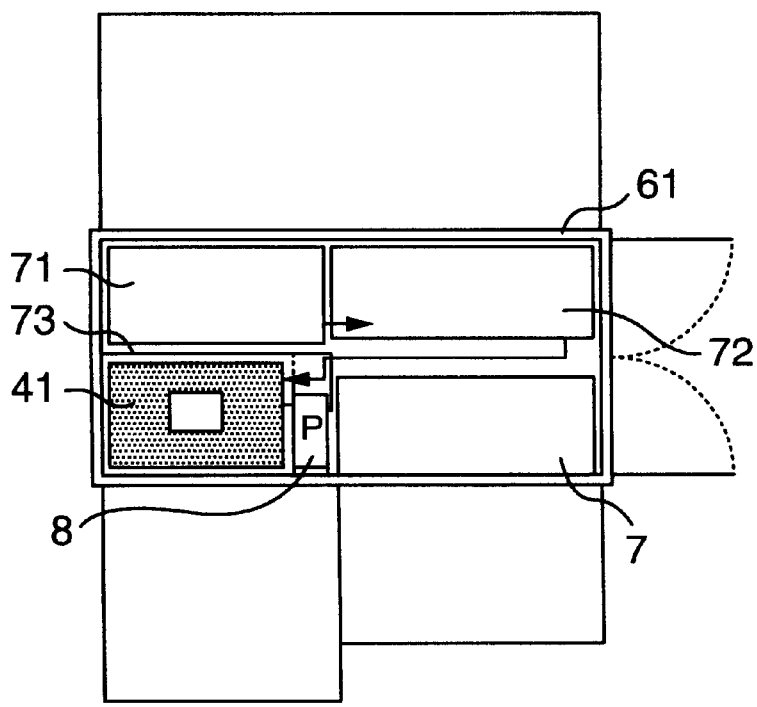
FIGS. 8A, 8B and 8C are three elevational views showing an arrangement within a container in accordance with another embodiment.
Figure 8C:
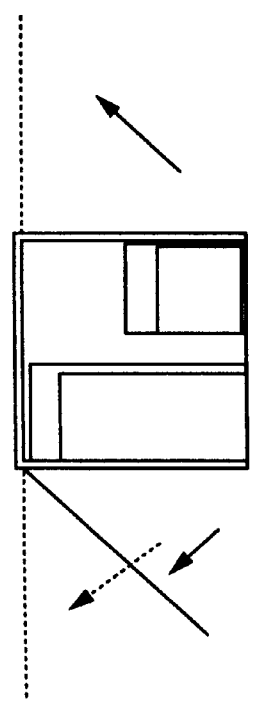
Figure 8B:
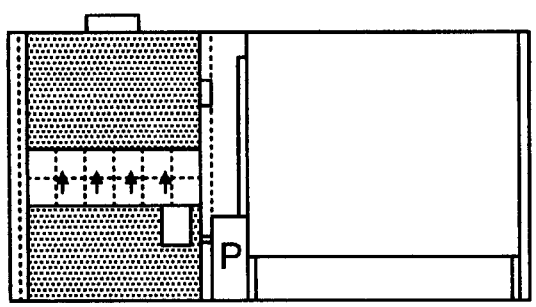

In FIGS. 8A, 8B and 8C, FIG. 8A is a top elevational view, FIG. 8B is a side elevational view and FIG. 8C is a backward side elevational view. The structure is made such that the fresh water generator 41 is surrounded by a partition plate 73, the side surface door of the fresh water generator 21 is separated into a front surface portion of the fresh water generator 41 and a front surface portion of the water storage tank 7, whereby it is possible to open only the fresh water generator 41. Accordingly, the fresh water generating apparatus 21 can be operated by opening only the door in the front surface portion of the fresh water generator 41, it is possible to prevent the dusts from being mixed into the water storage tank 7 or the fuel tank 71 and it is possible to prevent the fresh water generating apparatus 21 from being deteriorated and troubled, whereby it is possible to secure a reliability.

Figure 9A:
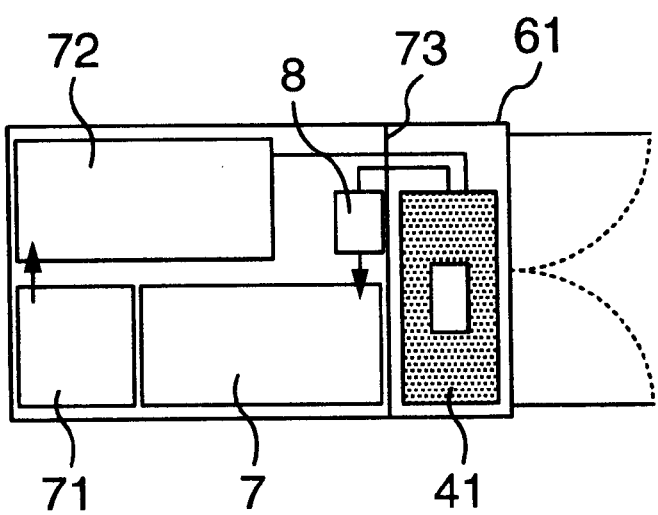
FIGS. 9A and 9B are three elevational views showing an arrangement within a container in accordance with the other embodiment.
Figure 9B:
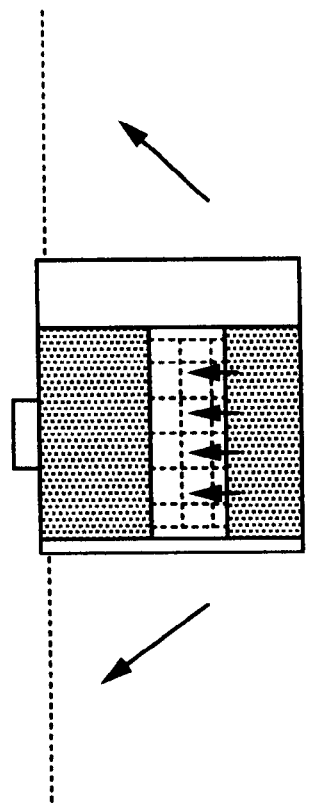

In FIGS. 9A and 9B, FIG. 9A is a top elevational view and FIG. 9B is a side elevational view. This structure corresponds to an embodiment in which the fresh water generator 41 is structured such as to be opened in a double hinged manner. Accordingly, it is possible to operate and maintain the fresh water generating apparatus 21 while closing a side surface door in which an area is forced to become wide, and it is easy to avoid an influence of the dusts even during the maintenance.

As mentioned above, in the desert area where a sea fog is generated at night, by condensing the water content in the ambient air by the fresh water generating apparatus so as to generate the fresh water, providing with the ventilating port and receiving the fresh water generator in the storage (the case) having the heat insulating material adhered to the inner side thereof, the temperature within the fresh water generator is not increased even when the daytime temperature increases near 50 degrees. Further, when the fresh water generating apparatus is controlled so as to be operated after the night when the fog is generated before an early morning and is not operated during the daytime, an energy efficiency is increased. Further, an amount of water collected by the fresh water generating apparatus corresponding to 15 horse power is about 500 liters per one day although a difference exists with the season, however, the fresh water can be evenly generated throughout the year and a salinity is low, so that the fresh water can be sufficiently used as an agricultural water.

Further, it is possible to self generate even in the developing area to which the electric power can not be supplied, it is possible to introduce the water at any place where the fog is generated, and it is possible to make the equipment space minimum since the fresh water generator and the power source are both loaded in the case. Further, since the fresh water generator is made compact, it is possible to generate the fresh water without increasing the temperature within the storage and it is possible to protect the apparatus even in the desert area where the daytime temperature increases near 50° C.

In accordance with the present invention, it is possible to obtain the fresh water generating apparatus having an improved fresh water generating efficiency, suitable for generating a lot of fresh water, not depending on an area at a time of placing or the like in correspondence to whether or not the electric power exists, being compact and easily transferred.

What is claimed is:

1. A fresh water generating apparatus for condensing a water content contained in an air so as to collect fresh water by utilizing a refrigeration cycle, comprising:
   a compressor for compressing a refrigerant gas;
   a condenser for cooling the refrigerant gas compressed in the compressor so as to condense;
   an expansion valve for reducing a pressure of a refrigerant liquid condensed in the condenser;
   an evaporator for evaporating the refrigerant liquid the pressure of which is reduced by the expansion valve;
   a blower for introducing an ambient air containing a water content from an external portion of a chamber so as to blow to said condenser and said evaporator;
   a water storage tank for recovering a fresh water obtained by the water content in the ambient air blown by the blower being cooled by said evaporator and condensed;
   a power source for driving said compressor and said blower; and
   a case receiving a fresh water generator receiving said compressor, said condenser, said expansion valve, said evaporator and said blower, having a blow-off port on an upper surface thereof and having a suction port to which a dust filter is mounted on a side surface, said water storage tank and said power generator.

2. A fresh water generating apparatus as claimed in claim 1, wherein said evaporator is placed at an upstream position within the air flow passage to which the ambient air is blown, and said condenser is placed at a downstream position.

3. A fresh water generating apparatus as claimed in claim 1, further comprising a fresh water generator receiving said compressor, said condenser, said expansion valve, said evaporator and said blower and provided with a drain pan collecting the condensed water, wherein the water collected in said drain pan is dipped by a pump so as to be stored in said water storage tank.

4. A fresh water generating apparatus for condensing a water content contained in an air so as to collect fresh water by utilizing a refrigeration cycle, comprising:
   a compressor for compressing a refrigerant gas;
   a condenser for cooling the refrigerant gas compressed in the compressor so as to condense;
   an expansion valve for reducing a pressure of a refrigerant liquid condensed in the condenser;
   an evaporator for evaporating the refrigerant liquid the pressure of which is reduced by the expansion valve;
   a blower for introducing an ambient air containing a water content from an external portion of a chamber so as to blow to said condenser and said evaporator;
   a water storage tank for recovering a fresh water obtained by the water content in the ambient air blown by the blower being cooled by said evaporator and condensed; and
   a power source for driving said compressor and said blower;
   a fuel tank in which a fuel is charged; and
   a power generator generating an electric power by using said fuel, wherein the electric power generated by said power generator is utilized as said power source.

5. A fresh water generating apparatus for condensing a water content contained in an air so as to collect fresh water by utilizing a refrigeration cycle, comprising:
   a compressor for compressing a refrigerant gas;
   a condenser for cooling the refrigerant gas compressed in the compressor so as to condense;
   an expansion valve for reducing a pressure of a refrigerant liquid condensed in the condenser;
   an evaporator for evaporating the refrigerant liquid the pressure of which is reduced by the expansion valve;
   a blower for introducing an ambient air containing a water content from an external portion of a chamber so as to blow to said condenser and said evaporator;

a water storage tank for recovering a fresh water obtained by the water content in the ambient air blown by the blower being cooled by said evaporator and condensed; and a power source for driving said compressor and said blower; and wherein said power source is a power generator generating an electric power by using the fuel stored in the fuel tank and the apparatus is provided with a case receiving a fresh water generator receiving said compressor, said condenser, said expansion valve, said evaporator and said blower, and having a heat insulating material being wound around an outer side thereof, said water storage tank, said power generator and said fuel tank.

* * * * *